United States Patent
Agrawal

(10) Patent No.: US 10,565,312 B2
(45) Date of Patent: Feb. 18, 2020

(54) CONTEXT-BASED ACTION RECOMMENDATIONS BASED ON A SHOPPING TRANSACTION CORRELATED WITH A MONETARY DEPOSIT AS INCOMING COMMUNICATIONS

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/725,164

(22) Filed: Oct. 4, 2017

(65) Prior Publication Data
US 2019/0102376 A1    Apr. 4, 2019

(51) Int. Cl.
| G06Q 30/02 | (2012.01) |
| H04M 3/523 | (2006.01) |
| G06F 3/16 | (2006.01) |
| G06F 17/16 | (2006.01) |
| G06F 8/20 | (2018.01) |
| H04L 12/58 | (2006.01) |
| G06F 17/27 | (2006.01) |
| G06Q 30/06 | (2012.01) |
| G10L 15/22 | (2006.01) |
| G10L 13/04 | (2013.01) |

(52) U.S. Cl.
CPC .......... *G06F 17/2785* (2013.01); *G06F 3/167* (2013.01); *G06F 17/2765* (2013.01); *G06Q 30/0631* (2013.01); *G10L 13/043* (2013.01); *G10L 15/22* (2013.01); *G10L 2015/223* (2013.01)

(58) Field of Classification Search
CPC ........ G06Q 30/02; H04M 3/523; G06F 3/167; G06F 17/16; G06F 8/20; H04L 51/046
See application file for complete search history.

(56) References Cited

U.S. PATENT DOCUMENTS

| 9,025,756 B1* | 5/2015 | Graham | ................ H04M 3/523 379/265.02 |
| 2005/0033582 A1* | 2/2005 | Gadd | ..................... G06Q 30/02 704/277 |

(Continued)

*Primary Examiner* — Farzad Kazeminezhad
(74) *Attorney, Agent, or Firm* — SBMC

(57) ABSTRACT

Various implementations provide context-based action recommendations based on an incoming communication. To provide the context-based action recommendation, a computing device collects information associated with a user that can be used to generate context information. Upon receiving an incoming communication, the computing device identifies various characteristics associated with the incoming communication. In turn, the computing device analyzes the context information, using the identified characteristics, to identify context information relevant to the incoming communication. Some implementations generate an action recommendation based on the identified context information such as a shopping transaction correlated with a monetary deposit, and notify the user of the action recommendation. In one or more implementations, when an audio control mode is enabled, the computing device the user of the action recommendation using an audible notification.

18 Claims, 6 Drawing Sheets

(56) References Cited

U.S. PATENT DOCUMENTS

| | | | | |
|---|---|---|---|---|
| 2008/0010229 A1* | 1/2008 | Lee Shu Tak | ............ | G06F 8/20 |
| | | | | 706/14 |
| 2008/0263451 A1* | 10/2008 | Portele | .................... | G06F 3/167 |
| | | | | 715/727 |
| 2015/0100152 A1* | 4/2015 | Barragan Trevino | ......................... | |
| | | | | G06Q 20/322 |
| | | | | 700/232 |
| 2017/0286401 A1* | 10/2017 | He | .......................... | G06F 17/16 |
| 2018/0351888 A1* | 12/2018 | Howard | ................ | H04L 51/046 |

* cited by examiner

CONTEXT-BASED ACTION RECOMMENDATIONS BASED ON A SHOPPING TRANSACTION CORRELATED WITH A MONETARY DEPOSIT AS INCOMING COMMUNICATIONS

BACKGROUND

Computing devices allow users to communicate with one another in various ways. For example, a user can communicate with other users via text messaging, e-mails, instant message, social media applications and/or websites, and so forth. While these forms of communication allow for communication exchanges, the textual nature of these exchanges sometimes fails to provide a context about the communication to the user that could impact or change how the user responds.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
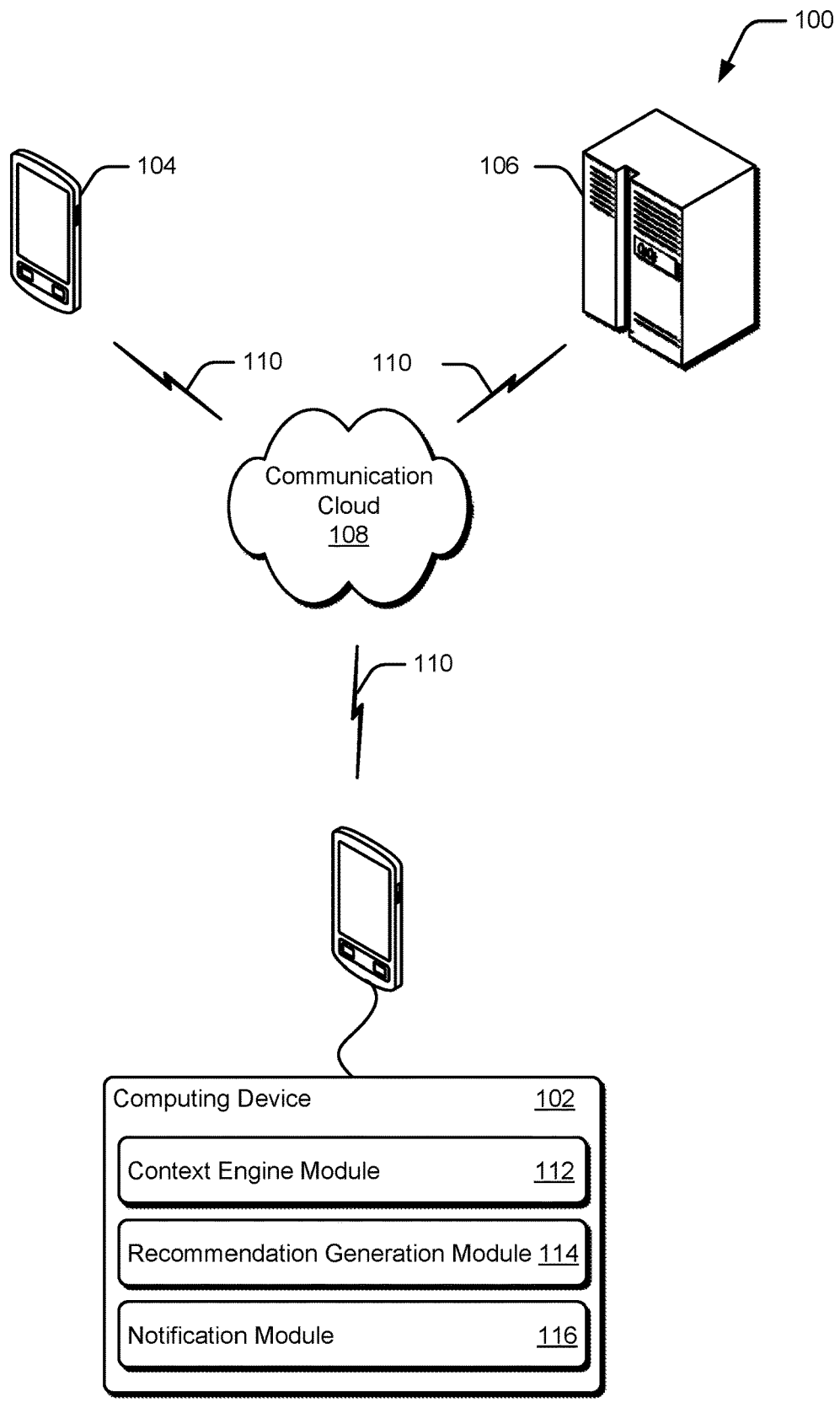
FIG. 1 is an overview of a representative environment that includes an example of context-based action recommendations in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Various implementations provide context-based action recommendations based on an incoming communication. To provide a context-based action recommendation, a computing device collects information associated with a user that can be used to generate context information. Upon receiving an incoming communication, the computing device identifies various characteristics associated with the incoming communication. In turn, the computing device analyzes the context information, using the identified characteristics, to identify context information relevant to the incoming communication. Some implementations generate an action recommendation based on the identified context information, and notify the user of the action recommendation. In one or more implementations, when an audio control mode is enabled, the computing device notifies the user of the action recommendation using an audible notification.

Consider now an example environment in which various aspects as described herein can be employed.

Example Environment

FIG. 1 illustrates an example environment 100 in accordance with one or more implementations. Environment 100 includes computing device 102 (in the form of a mobile phone) that is capable of exchanging communications with other devices. To illustrate this capability, environment 100 includes mobile phone 104 and server 106 that communicate with computing device 102 over communication cloud 108. For example, using communication cloud 108, computing device 102 can exchange text communications, voice communications, e-mails, and/or video communications with mobile phone 104. Alternately or additionally, computing device 102 can exchange data with server 106 using communication cloud 108, such as by accessing a web site hosted by server 106, accessing an e-mail client that connects with server 106, accessing a shopping application supported by server 106, and so forth.

Communication cloud 108 generally represents any suitable type of communication network that facilitates a bi-directional link between various computing devices. Communication cloud 108 can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, and so forth. In this example, communication cloud 108 connects computing device 102 with mobile phone 104 and server 106 via communication links 110. These communication links generally represent communication paths can be used to exchange any suitable type of data and/or information. In some implementations, communication links 110 represent a communication link that is local to computing device 102, such as a Bluetooth™ wireless link, an infrared wireless communication link, a direct cable connection between devices, and so forth.

Computing device 102 includes context engine module 112 to track raw data about a user and/or to generate context information about the user by analyzing the raw data. Raw data can include any singular type of data, such as a count of button clicks on a particular application, a timestamp, relationship information for a contact, and so forth. Context information represents an analysis and/or interpretation of that raw data, such as an average value generated from the raw data, user application preferences, user communication mode preferences (e.g., text, e-mail, voice), most frequently visited websites, user preferred contacts, pending purchase transactions, and so forth. Together and/or independent from one another, the raw data and context information describe a context about the user and/or the user's interactions with computing device 102. For instance, context engine module 112 can track communications from a particular sender to computing device 102 to generate context information related to that particular sender and/or communications associated with that particular sender (e.g., frequency of communications, total number of communications, preferred type of communication, duration between communications, content preferences, etc.). Thus, context engine module 112 can track or store information that identifies items and/or actions of interest to the user which can be subsequently applied to incoming communications. Any suitable type of algorithm can be used to generate the contextual data, such as statistical operations, Decision Trees, Advanced Data Mining Techniques, Linear Regression, Apriori Learning, K-means Learning, and so forth.

Computing device 102 also includes recommendation generation module 114 that can be used to generate action recommendations that suggest particular actions to the user. In some implementations, the action recommendations are based upon various characteristics associated with an incoming message or communication. For instance, consider an example in which computing device 102 receives an incoming text message from a particular sender. Recommendation generation module 114 can first identify various characteristics about the incoming text message, such as identifying the particular sender, identifying particular content within the text message, etc., and subsequently analyze the context information and/or raw data generated by context engine module 112 to generate an action recommendation relevant to the user. As one example, the analysis of the context information can determine that the particular sender is a family member related to the user of computing device 102 that has a higher priority relative to other contacts and/or senders. In turn, recommendation generation module 114 can use this context information to generate an action recommendation to the user, such as "This family member has a birthday tomorrow, would you like to send a present?", "You haven't communicated with this family member in a month, would you like to respond now?", and so forth. Thus, recommendation generation module 114 can generate an action recommendation that includes an action suggestion (e.g., "would you like to send a present") and/or context information not present in the incoming communication (e.g., "this family member has a birthday tomorrow"). Similar to that described with respect to context engine module 112, recommendation generation module 114 can apply or use various data mining algorithms relative to one or more identified characteristics to generate action recommendations based relative to the characteristics, examples of which are further described herein.

Computing device 102 also includes a notification module 116 to notify the user of the action recommendation. In some implementations, the notification module 116 determines computing device 102 is in an audio control mode, and subsequently generates an audible notification of the action recommendation, such as by using a text-to-speech algorithm. In turn, the notification module audibly notifies the user of the action recommendation by forwarding the audio clip to audio hardware. Alternately or additionally, notification module 116 generates a visual notification of the action recommendation and/or the incoming communication and forwards the visual notification to a display system. Some implementations of notification module 116 also provide the user with a control or mechanism to invoke or accept the action recommendation as further described herein.

Figure 2:
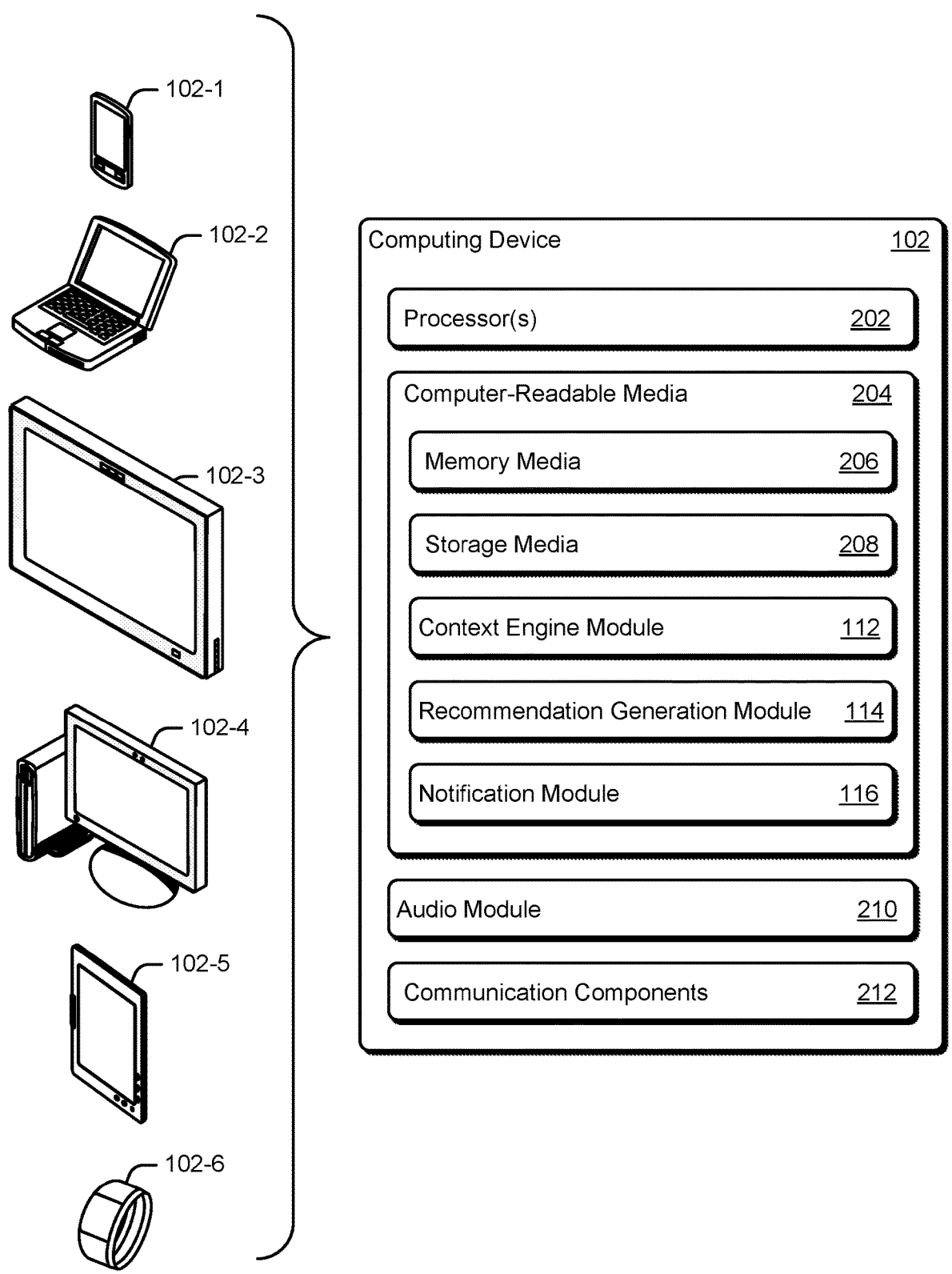
FIG. 2 illustrates a more detailed example of context-based action recommendations in accordance with one or more implementations.

FIG. 2 illustrates an expanded view of computing device 102 of FIG. 1 with various non-limiting example devices including: smartphone 102-1, laptop 102-2, television 102-3, desktop 102-4, tablet 102-5, and smart watch 102-6. Accordingly, computing device 102 represents any suitable device that incorporates context-based action recommendations as further described herein. Computing device 102 includes processor(s) 202 and computer-readable media 204, which includes memory media 206 and storage media 208. Applications and/or an operating system (not shown) embodied as computer-readable instructions on computer-readable media 204 are executable by processor(s) 202 to provide some, or all, of the functionalities described herein. For example, various embodiments can access an operating system module, which provides high-level access to underlying hardware functionality by obscuring implementation details from a calling program, such as protocol messaging, register configuration, memory access, and so forth.

Computer-readable media 204 includes context engine module 112, recommendation generation module 114, and notification module 116 of FIG. 1. While context engine module 112, recommendation generation module 114, and notification module 116 are illustrated here as residing on computer-readable media 204, they can alternately or additionally be implemented using hardware, firmware, software, or any combination thereof.

Computing device 102 includes audio module 210 and communication components 212. Audio module 210 represents functionality that can audibly project an action recommendation, such as a speaker and/or an earphone jack that connects to external speakers. Communication components 212 represent functionality that enables computing device 102 to physically transmit data to, and receive data from, external devices, such as an input/output port or a transceiver chain. Some portions of communication components 212 perform signal and/or protocol processing to implement data transfer via communication links 110 of FIG. 1. While audio module 210 and communication components 212 are illustrated here as single components, each can be implemented as varying combinations of hardware, firmware, and/or software. For instance, in some embodiments, audio module 210 and/or communication components 212 comprise hardware that includes embedded firmware. Alternately or additionally, hardware components of audio module 210 and/or communication components 212 can couple to a software driver that an application interfaces with in order to access functionality provided by the hardware.

Having described an example operating environment in which various aspects of context-based action recommendations can be utilized, consider now generating action recommendations for an incoming communication in accordance with one or more implementations.

Generating Context-Based Action Recommendations

A user can interact with a computing device in multiple ways. For instance, the user can send or receive voice and/or video calls, can access remote servers via a web browser or customized application, exchange e-mails, and so forth. In addition to exchanging data with remote users and/or computing devices, users can locally interact with the computing device, such as by adding contact information, storing notes, playing games, taking pictures, using a word processor, and so forth. To aid the user, some computing devices provide notifications when notable events of interest occur. For example, a computing device can visually modify a display with a note, icon, message, or other type of indicia to alert the user of an incoming (or received) text message, e-mail, software update, voice call, etc. Alternately or additionally, the computing device can play an audible notification, such as a ring tone, a beep, and so forth.

Some computing devices also provide audio control to the user. For instance, some computing devices support an audio control mode that allows the user to enter audible input commands and/or outputs audible notifications of various events. As one example, instead of playing an audible ring tone notification for an incoming voice call, the audio control mode can use a verbal indication, such as and audio clip that verbalizes the phrase "Incoming call from Nathan". In turn, the user can verbally enter a command, such as "Answer Incoming Call" or "Send Incoming Call to Voice Mail", to respond to the incoming call instead of physically actuating a control button or mechanical interface. Some implementations of an audio control mode convert the content of an incoming communication, such as a text message, to audio using text-to-speech algorithms, and then play out the corresponding audio to the user. However, these forms of notifications, whether audible or visual, are impersonal notifications that lack specific or customized information to the user. Accordingly, without specific or customized context information relevant to the incoming communications, a user may miss opportunities on how to respond. In other words, without the specific or customized context information, the user may respond in a different manner than if they were aware of the context information relevant to the communication.

Various implementations provide context-based action recommendations relevant to an incoming communication. A computing device collects information associated with a user, such communications to various users, frequented websites, favored applications, and so forth, to generate context information about the user. At some point later in time, the computing device receives an incoming communication, and identifies various characteristics about the incoming communication. An incoming communication can correspond to incoming data from an external device, and/or correspond to information or events generated by an application executing on the computing device. In other words, the incoming communication can be externally driven (e.g., a text message), internally driven (e.g., a calendar event), or any combination thereof. To provide context information that corresponds to the incoming communication, the computing device identifies characteristics about the incoming communication. In turn, the computing device analyzes the context information, using the identified characteristics, to identify context information about the user that is relevant to the incoming communication. Some implementations then generate an action recommendation based on the identified context information, and notify the user of the action recommendation.

Figure 3:
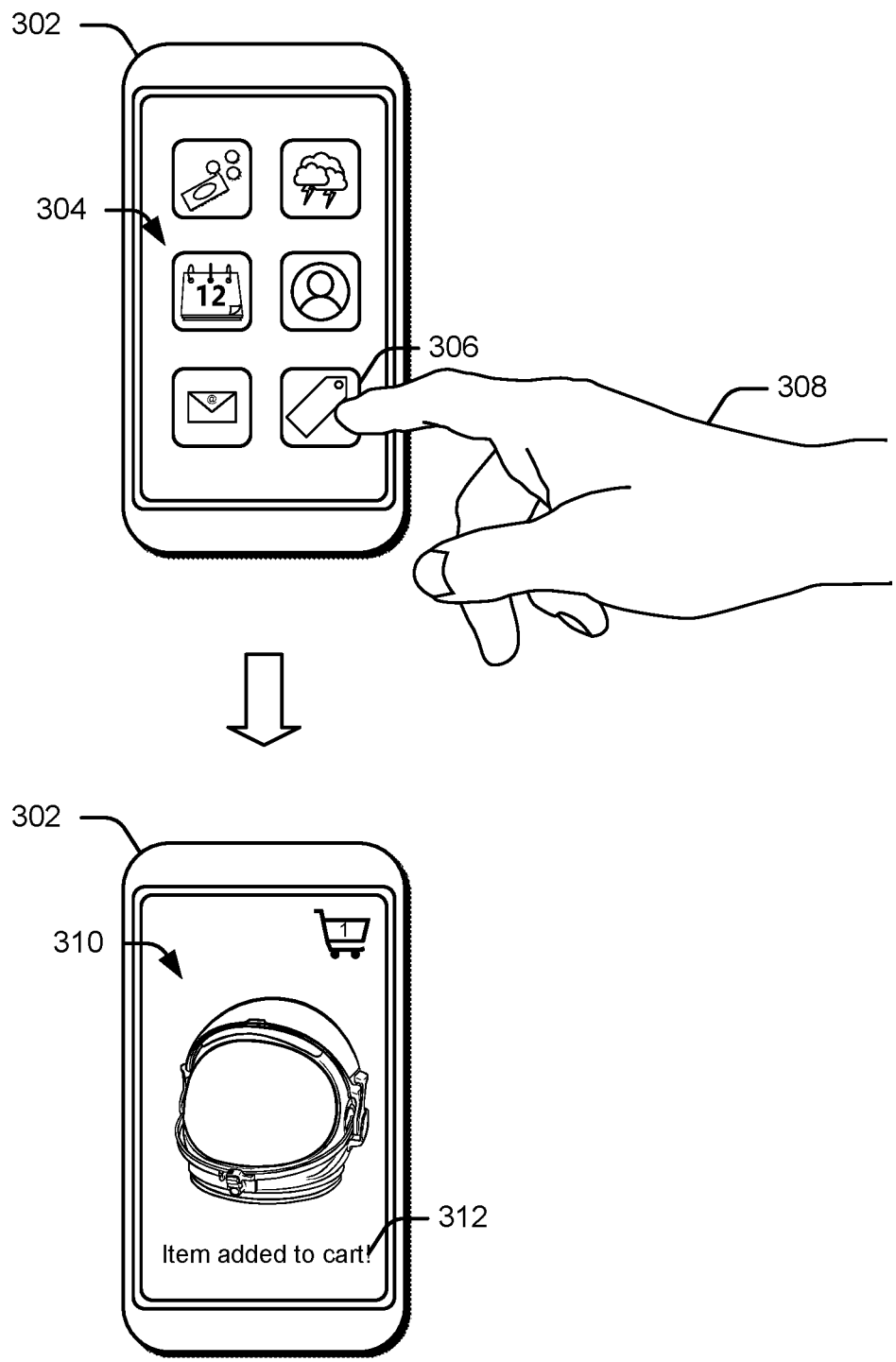
FIG. 3 illustrates an example of context tracking in accordance with one or more implementations.

Consider FIG. 3 that includes mobile phone 302. In some implementations, mobile phone 302 is representative of computing device 102 of FIG. 1 with connectivity to external devices. In this example, mobile phone 302 includes various applications that can be accessed via displayed control mechanisms, generally illustrated here as icons 304. The applications can be any suitable type of application, such as a banking application, a weather application, a calendar application, a contact application, an e-mail application, a shopping application, a web browser, a gaming application, a mapping application, a social media application, a texting application, a wallet application, and so forth. One particular application included on mobile phone 302, shopping application 306, provides the user with the ability to make on-line purchase transactions associated with Store XYZ. In other words, shopping application 306 connects to a remote server that hosts an on-line store for Store XYZ, and implements a user interface that the user can navigate in order to browse and/or purchase the various items available at Store XYZ. Accordingly, user hand 308 invokes shopping application 306 by touching a location on a touch screen corresponding to the application's icon.

In some implementations, mobile phone 302 tracks the user interactions with shopping application 306, such as by way of context engine module 112 of FIG. 1. By tracking the user interacting with the application, mobile phone 302 can generate context and/or historical data. For instance, the mobile phone can monitor how frequently the user interacts with shopping application 306 relative to other applications, a maximum/minimum/average time duration between interactions with shopping application 306, how often purchases are made using shopping application 306, pending purchase transactions associated with shopping application 306, and so forth. This can be achieved in any suitable manner, such as by context engine module 112 (not illustrated here) interfacing with an operating system on mobile phone 302 and/or shopping application 306 to subscribe to, or be notified of, various user events that occur. While described with respect to shopping application 306, it is to be appreciated that mobile phone 302 can monitor other forms of user interaction with other applications and/or features provided by mobile phone 302.

When the user invokes shopping application 306, the shopping application displays various user interfaces that the user navigates to browse the various items that Store XYZ provides. One example, user interface 310, displays an item for purchase. As indicated by notification 312, the user has added an item to a corresponding shopping cart associated with Store XYX. In turn, mobile phone 302 (by way of context engine mobile 112) tracks that the user has placed an item in a corresponding shopping cart of Store XYZ. By monitoring this interaction, mobile phone 302 obtains context information pertaining to the user and the corresponding interactions with shopping application 306. The mobile phone can monitor other types of user interactions as well, such as which items are added to a wish-list or registry, preferred payment methods, frequency of user response to sales, when a purchase transaction is completed, when a purchase transaction is pending, and so forth.

At some point later in time, mobile phone 302 can use the gathered information to generate a context-based action recommendation in response to an incoming communication. To demonstrate, now consider FIG. 4 that illustrates an example of adding context information to a notification in accordance with one or more implementations. Here, FIG. 4 includes mobile phone 302 of FIG. 3 and server 106 of FIG. 1, where server 106 is a remote server associated with a bank account corresponding to the user. In some scenarios, FIG. 4 is a continuation of the example described with respect FIG. 3.

Figure 4:
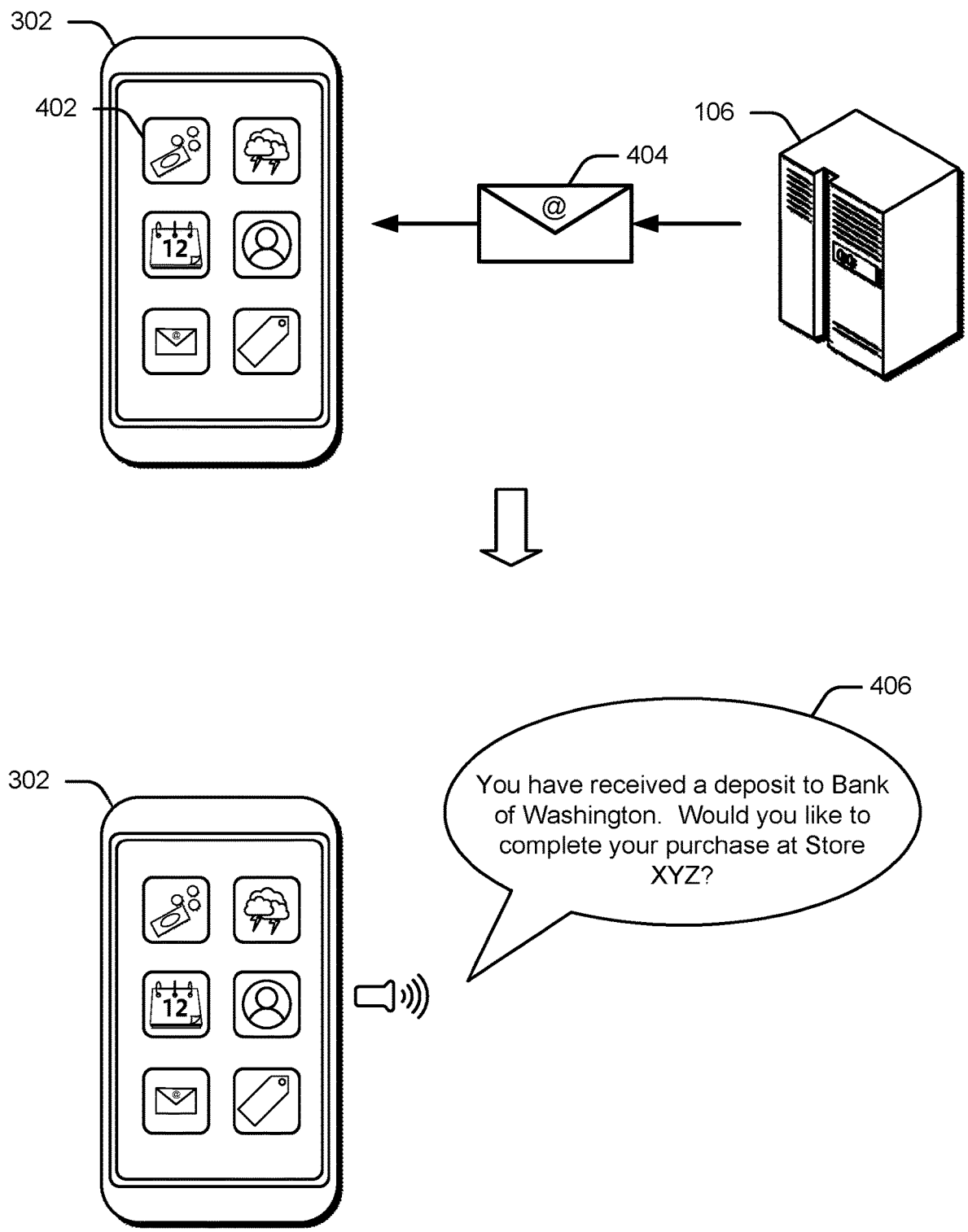
FIG. 4 illustrates an example of a context-based action recommendation in accordance with one or more implementations.

In FIG. 4, the user has loaded a banking application 402 as a way to access their bank account and/or receive communications from server 106. While banking application 402 provides the user with connectivity to server 106, it is to be appreciated that mobile phone 302 can receive alternate forms of communication from server 106 without installing and/or using banking application 402. At some arbitrary point in time, mobile phone 302 receives a notification 404 from server 106 indicating that a deposit has been made to the user's bank account. For discussion purposes, server 106 sends the notification 404 as an e-mail to banking application 402, but it is to be appreciated that notifications can be sent in other manners. For example, server 106 can send notifications to an e-mail client or to a preferred address in a preferred communication mode (e.g., text message, e-mail message, etc.).

Upon receiving notification 404, mobile phone 302 identifies various characteristics corresponding to the incoming communication. The identification process can be triggered in any suitable manner. As one example, banking application 402 can notify recommendation generation module 114 of FIG. 1 (not illustrated here) of the incoming communication. Alternately or additionally, some implementations of recommendation generation module 114 subscribe to incoming event notifications from a corresponding operating system, user identified applications, and so forth. After triggering the identification process, the mobile device analyzes the incoming communication in order to identify various characteristics, such as the sender of the notification, the content of the notification, and so forth. As one example, a content analysis of notification 404 can identify characteristics corresponding to predefined key words or phrases, such as identifying the content of the communication includes phrases "deposit made", "paycheck", "account balance", etc. As another example, a sender analysis of notification 404 can identify characteristics that indicate the incoming communication originated from a bank associated with server 106. However, other types of characteristics from an incoming communication can be identified as well, such as time-based characteristics, date-based characteristics, location-based characteristics, application-based characteristics, contact-based characteristics, domain- and/or address-based characteristics, etc.

Upon identifying the various characteristics, the mobile phone 302 generates an action recommendation by analyzing the context information generated by context engine module 112 (not illustrated here). Recall from FIG. 3 that the user failed to complete the purchase transaction with Store XYZ. Using various data mining algorithms, the recommendation generation module can make a correlation between a deposit being made to the user's bank account and an observation that an uncompleted purchase transaction exists at Store XYZ, which is a store the user visits more frequently than other stores. Subsequently, by analyzing the content information using the identified characteristics, the mobile phone generates an action recommendation to complete the purchase transaction at Store XYZ. As another example, the recommendation generation module can make a correlation between a deposit being made and some unresolved financial transactions and/or bills that are due to be paid, and subsequently generate an action recommendation to pay a bill.

Once the mobile phone has generated an action recommendation, it notifies the user of the incoming communication and the action recommendation. In FIG. 4, mobile phone 302 is operating with an audio control mode enabled. When operating with the audio control mode enabled, mobile phone 302 supports verbal inputs commands, and audibly notifies the user of events of interest. Thus, upon receiving notification 404 and generating an action recommendation based on notification 404, mobile phone 302 plays audible message 406 on an output speaker. In this example, audible message 406 includes two parts: a notification of the incoming communication, "You have received a deposit to Bank of Washington", and the action recommendation, "Would you like to complete your purchase at Store XYZ". While FIG. 4 illustrates an audible message, other implementations alternately or additionally display the notification and action recommendation on a corresponding display device. Accordingly, mobile phone 302 does not just provide a notification of the incoming communication, but additionally provides an action recommendation specific to the user based on contextual data.

Some implementations provide the user with a prompt or control the user can actuate to invoke an application associated with the action recommendation. For instance, mobile phone 302 can display a control button the user can actuate to invoke one or more applications that help the user or the mobile phone to perform the action recommendation. Similarly, the user can audibly confirm the action recommendation and/or invoke applications associated with the action recommendation. Thus, in response to receiving a verbal input and/or the actuation of a control, mobile phone 302 invokes any related code, software, or application. Conversely, if the user fails to respond to the action recommendation, such as a timer of the mobile phone 302 expiring prior to receiving input from the user, mobile device 302 ignores and/or purges the action recommendation.

While described in the context of using characteristics from an incoming communication, some implementations alternately or additionally use active user feedback to generate an action recommendation. The phrase active user feedback refers to direct user feedback in response to a prompt for feedback, such as a prompt asking the user for feedback on whether to prioritize bill payments over store purchases. The recommendation generation module can then use the active user feedback at a later point in time to generate action recommendations based on prioritizing bill payment transactions over store purchase transactions. Alternately or additionally, some implementations use inactive user feedback to generate an action recommendation. The phrase inactive user feedback refers to learned user preferences through indirect user input (e.g., user input other than input to a prompt for direct feedback). For example, the context engine module and/or the recommendation generation module can observe whether the user followed an action recommendation, or ignored the action recommendation, to make a store purchase, and use this inactive feedback for future action recommendations.

By using context information gathered over time and characteristics about an incoming communication, mobile phone 302 can generate an action recommendation that correlates and/or connects two unrelated items. To illustrate, mobile phone 302 uses context information to connect a monetary deposit at Bank of Washington to an uncompleted purchase transaction, even though the notification from the Bank of Washington is unrelated to Store XYZ, since notification 404 does not include any indication of the purchase item, Store XYZ, or the uncompleted purchase transaction. In other words, server 106 directs notification to a first application: banking application 402, but the subsequent action recommendation directs or suggest the user open or invoke a second application that is unrelated: shopping application 306 of FIG. 3. In this instance, mobile device connects or correlates two unrelated applications. Thus, the action recommendation is not just a factual statement that announces the incoming communication. Rather, the mobile device attempts to recommend an action specific to the user based upon contextual and/or historical information.

While the above example relates to generating an action recommendation based upon financial and/or purchase transactions, a computing device can generate other types action recommendations. For example, consider a scenario in which the user of a computing device attempts to contact a same contact and/or address multiple times without success. Various implementations monitor uncompleted communication attempts, either by monitoring a single communication mode, or monitoring a combination of various communication modes (e.g., a voice call, a video call, an instant message, a text message, an e-mail, etc.). A computing device can alternately or additionally track and/or generate context information about these communications, such as the frequency of user attempts to call or communicate with the contact, timestamps to identify the duration between communication attempts, contact priority information, relationship information, personal information about the contact, etc. In turn, when an incoming communication comes in from the contact, the computing device can notify the user not only of the incoming communication, but add an action recommendation and/or context information to the notification. For example, consider a scenario in which a user's mother has attempted to contact the user several times, but unsuccessfully. The computing device can generate context information that indicates there have been several unanswered and/or unsuccessful communication attempts from their mother. In turn, when the computing device detects another incoming voice communication from the user's mother, various implementations can add context information to a notification of the incoming call such as "You have an incoming voice call from your mother. Tomorrow is her birthday, and you have missed multiple calls from her. Would you like to order her some flowers?" This helps the user to not only prioritize answering the voice call, but adds an action specific to the incoming communication based on the context information that the caller is the user's mother, that there have been several unsuccessful communication attempts, and that her birthday is the next day.

As another example, a computing device can identify an incoming communication from a contact or address associated with a health profession. In turn, the computing device can use additional context information to provide a health-based action recommendation to the user. For instance, a calendar application may indicate that the user had an appointment with the health professional two days prior, or a health tracking application may indicate that the user has abnormal biometric readings. In turn, the computing device may notify the user of the incoming communication by audibly stating (or visually displaying) "There is an incoming communication from your health provider. Your heart monitor indicates your heart beat is abnormal, would you like to discuss this with the health provider now?" or "The incoming call is from the health provider you had an appointment with on Wednesday. Would you like to answer to discuss the appointment?" Thus, by providing action recommendations based upon context information, the computing device can provide the user with user-specific information that gives the incoming communication more significance relative to when the user-specific information is not provided.

Figure 5:
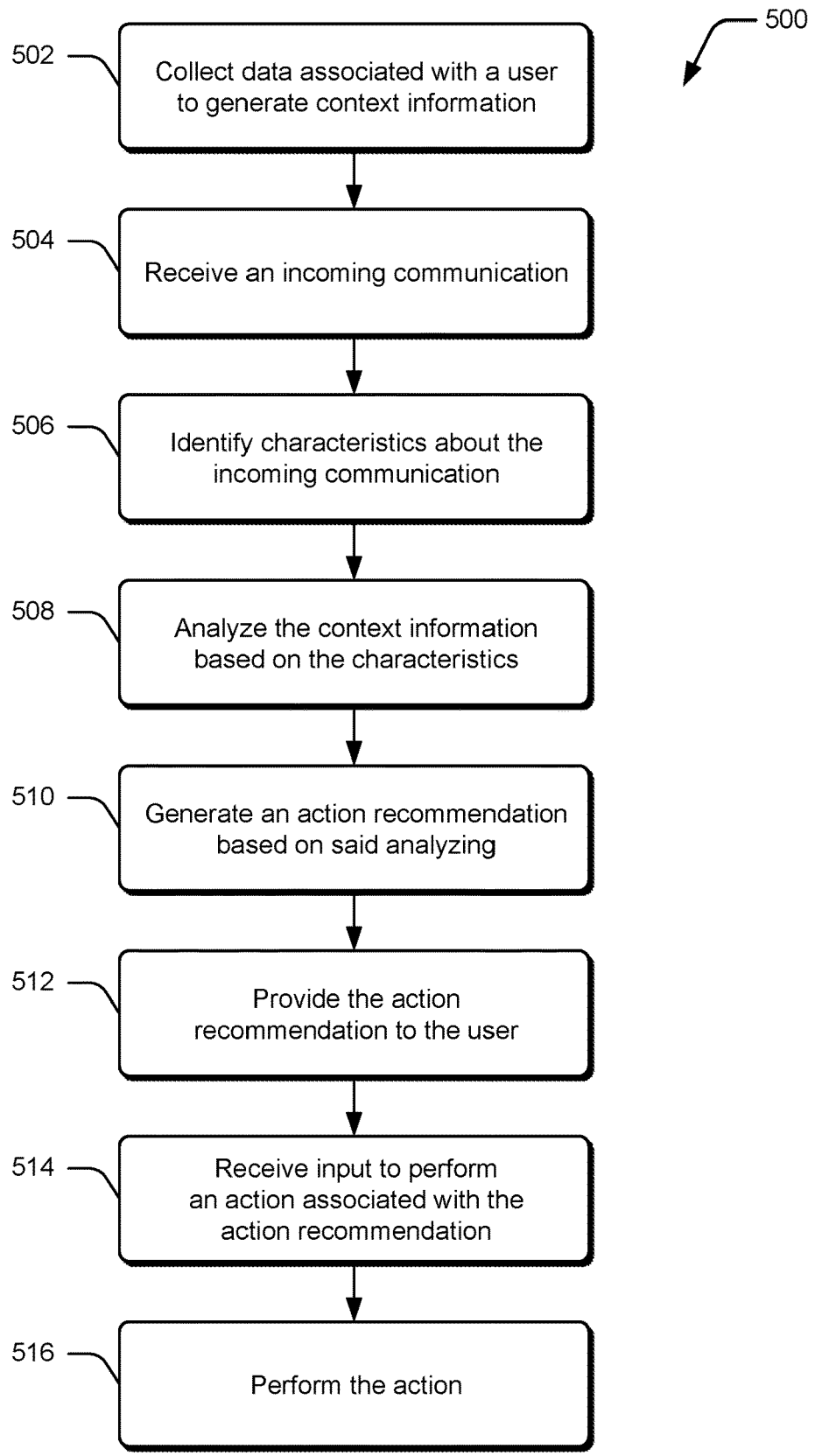
FIG. 5 illustrates a flow diagram that generates context-based action recommendations in respond to an incoming communication in accordance with one or more implementations.

Now consider FIG. 5 that illustrates a method that uses context-based action recommendations in accordance with one or more implementations. The method can be performed by any suitable combination of hardware, software, and/or firmware. In at least some embodiments, aspects of the method can be implemented by one or more suitably configured hardware components and/or software modules, such as context engine module 112, recommendation generation module 114, and/or notification module 116 of FIG. 1. While the method described in FIG. 5 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 502, a computing device collects data associated with a user to generate contextual and/or historical information about the user. For example, the computing device can collect data on frequently used applications relative to other applications, frequently used websites relative to other websites, uncompleted communication attempts (by the user and/or to the user), contact relationship information, preferred communication modes, call log information, etc. In some implementations, the data collection process collects raw data, such as timestamp data points, usage counts, time-to-response data points, and so forth. Alternately or additionally, the data collection process can include generating context information from the raw data, such as analyzing each time-to-response data point to identify which contact the user responds to the quickest, which contact the user ignores, etc.

At 504, the computing device receives an incoming communication. An incoming communication can originate from an external device, such as a text message, an e-mail, a voice call, and so forth, or it can originate from an internal entity, such as a reminder or alarm from an application operating internal to the computing device.

At 506, the computing device identifies characteristics about the incoming communication. Some implementations identify a single characteristic about the incoming communication, while other implementations identify multiple characteristics, examples of which are provided herein. The characteristics can be any suitable type of characteristic, such as data points about the communication (e.g., sender, time sent, location of origin, communication mode, is a group chat, etc.). Alternately or additionally, the characteristics can be based upon the content included within the communication (e.g., the communication is an invite to an event, a bill from a health professional, is related to a financial transaction, etc.). Characteristics can be identified in any suitable manner, such as by matching a predefined key phrase to content included in the communication, by extracting header information from the communication, by using timestamps associated with the communication, and so forth.

The computing device analyzes the context information based on the characteristics at 508. For example, the computing device can use a characteristic that identifies the sender of the incoming communication to analyze the context information and determine if the user has missed previous communications from the sender, has any pending actions or appointments with the sender, usually ignores incoming communications from the senders and so forth. As another example, the computing device can use a characteristic that identifies content of the incoming communication, such as a predefined key phrase included in the incoming communication, and analyze context information to determine if the user has and pending actions corresponding to the key phrase, contacts that might be interested in the key phrase, and so forth. Thus, the computing device can use the characteristics to perform data mining on the context information as further described herein. Some implementations alternately or additionally use active user feedback or inactive user feedback during the analysis process as further described herein.

At 510, the computing device generates an action recommendation based on the analysis. The action recommendation can include any suitable type of action, such as an action recommendation to complete a purchase transaction, to perform a financial transaction, to log onto a website, to generate an outgoing communication, to send a gift, to invoke and/or interact with an application, and so forth. As one example, the analysis of the context information can result in determining that the user's biometric and/or vital signs are above or below normal due to the incoming communication. In turn, the action recommendation can be health based (e.g., an action recommendation for the user to sit and rest, hydrate, sleep, call a doctor, etc.).

Upon generating the action recommendation, the computing device provides the action recommendation to the user at 512. For instance, if the computing device determines that it is operating with an audio control mode enabled, the computing device provides an audible notification of the action recommendation. Alternately or additionally, the computing device can visually display the action recommendation. Some implementations display a control button with the action recommendation that allows the user to perform and/or initiate the action recommendation as further described herein.

At 514, the computing device receives input to perform an action associated with the action recommendation. In some implementations, the computing device receives audio input via a microphone electronically coupled to, or included in, the computing device. The audio input can be a reply to a prompt provided by the computing device, such as a "Yes", or "No" reply that causes the computing device to take action, or can include additional information, such as "Yes, locate a telephone number to Florist Florence", "Open Store XYZ application", "Check calendar availability for Tuesday", "Call my doctor", and so forth. Accordingly, the computing device analyzes the audio input to identify what commands and/or actions to perform. Alternately or additionally, the computing device can receive input through a control button or input device, such as the actuation of a control button via a touchscreen display or the activation of a mechanical button.

Responsive to receiving the input, the computing device performs a corresponding action at 516. For example, if the computing device receives the audio input "Yes" to an action recommendation of "Would you like to send a gift", the computing device performs a corresponding action, such as opening a shopping application, locating a florist, and so forth. In this scenario, the computing device has predetermined an action that corresponds to the action recommendation. As another example, if the computing device receives audio input with additional information, such as "Check calendar availability for Tuesday", the computing device analyzes the audio input to determine the corresponding action and/or command, and then subsequently performs the determined action or command. The corresponding action performed can be directly related to the incoming communication, such as generating a new e-mail in response to receiving an e-mail, or can be indirectly related to the incoming communication, such as opening a shopping application in response to receiving an incoming voice call.

By generating an action recommendation using context-based information, a computing device can provide the user with more intelligent notifications for incoming communications. Instead of notifying the user with factual information that an incoming communication has been received, the computing device uses context information about the user and the incoming communication to generate suggestions to the user that may otherwise be missing from the incoming communication. The addition of context-based suggestions to the notification of an incoming communication gives more meaningful options that are specific to the user, which subsequently enhances the user's experience.

Having described an example of context-based action recommendations based on an incoming communication, consider now a discussion of an example device in which can be used for various implementations.

Example Device

Figure 6:
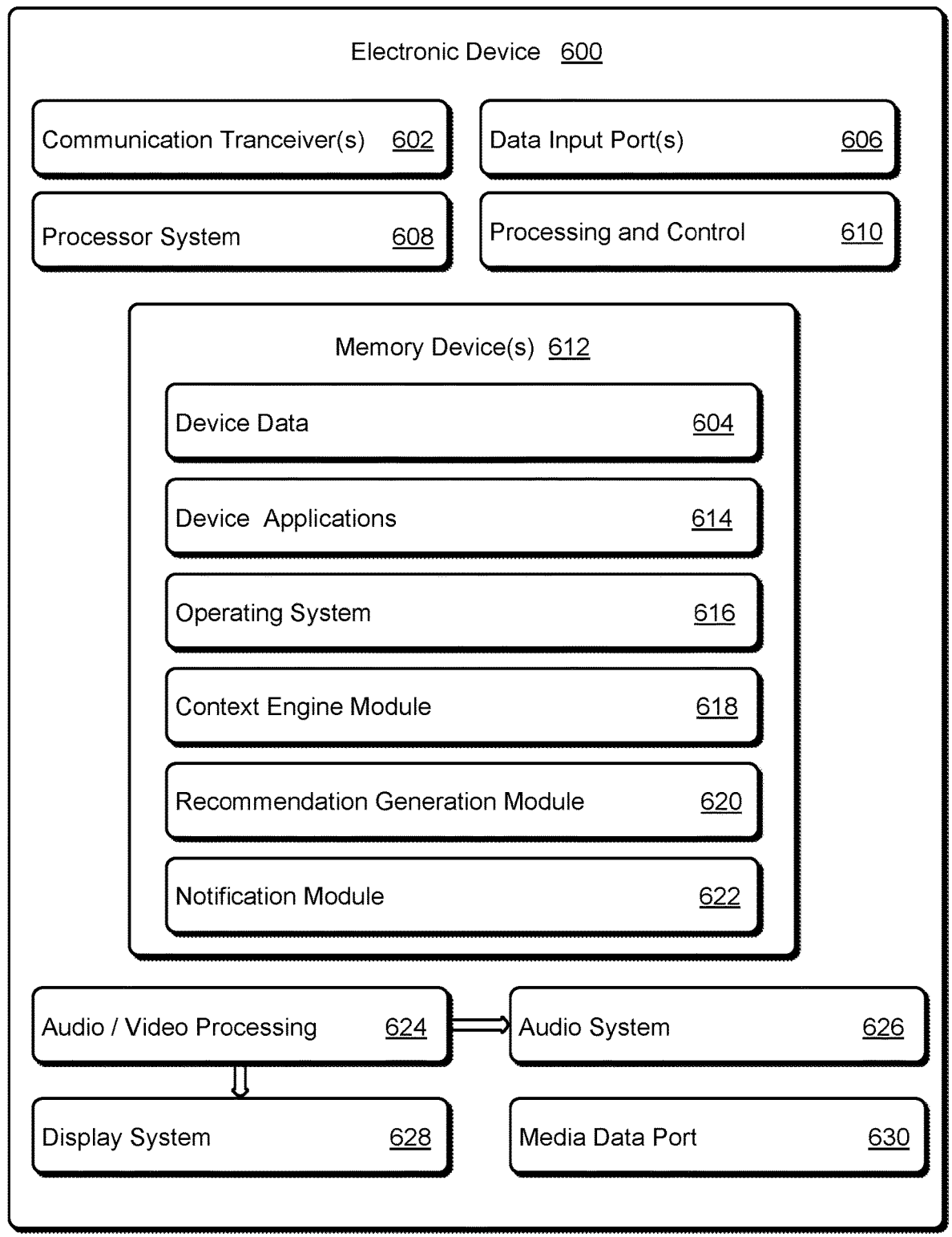
FIG. 6 is an illustration of an example device in accordance with one or more implementations.

FIG. 6 illustrates various components of an example electronic device 600, such as computing device 102 of FIG. 1, that can be utilized to implement various aspects as further described herein. Electronic device 600 can be, or include, many different types of devices capable of realizing context-based action recommendations in accordance with one or more implementations.

Electronic device 600 includes communication transceivers 602 that enable wired or wireless communication of device data 604, such as received data and transmitted data. While referred to as a transceiver, it is to be appreciated that communication transceivers 602 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Electronic device 600 may also include one or more data-input ports 606 via which any type of data, media content, and inputs can be received, such as user-selectable inputs, messages, music, television content, recorded video content, and any other type of audio, video, or image data received from any content or data source. Data-input ports 606 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Electronic device 600 of this example includes processor system 608 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 610. Although not shown, electronic device 600 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 600 also includes one or more memory devices 612 that enable data storage, examples of which include random access memory (RAM), non-volatile memory (e.g., read-only memory (ROM), flash memory, EPROM, EEPROM, etc.), and a disk storage device. Memory devices 612 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 612 provide data storage mechanisms to store the device data 604, other types of information or data, and various device applications 614 (e.g., software applications). For example, operating system 616 can be maintained as software instructions within memory devices 612 and executed by processor system 608.

In some aspects, memory devices 612 includes context engine module 618, recommendation generation module 620, and notification module 622. While these modules are illustrated and described as residing within memory devices 612, other implementations of these modules can alternately or additionally include software, firmware, hardware, or any combination thereof.

Context engine module 618 tracks information about a user that is subsequently used to generate context information. This can include name information, location information, contact information, biological information, previous communications, likes, dislikes, patterns of past communications, preferred applications, preferred websites, and so forth. In some implementations, context engine module 618 tracks raw data. Alternately or additionally, context engine module 618 generates context information from the raw data, such as through statistical analysis, data mining techniques, etc.

Recommendation generation module 620 generates an action recommendation using the raw data and/or context information tracked and/or generated by context engine module 618. Alternately or additionally, recommendation generation module 620 uses information associated with an incoming communication to generate the action recommendation, examples of which are provided herein. The action recommendation can be directly related to the incoming communication, where the action recommendation corresponds to an entity or a communication mode associated with the incoming communication, or be indirectly related, where the action recommendation connects two previously unrelated entities, actions, communication modes, etc.

Notification module 622 generates a notification of the action recommendation and/or the incoming communication. In some implementations, the notification generates an audible notification, such as by using text-to-speech algorithms. Alternately or additionally, notification module 622 visually displays the action recommendation and/or notice of the incoming communication. This can include visually displaying a control button associated with performing all or part of the action recommendation.

Electronic device 600 also includes audio and video processing system 624 that processes audio data and passes through the audio and video data to audio system 626. In some implementations, audio processing system processes data from notification module 622 as a way to project an audible action recommendation. Audio system 626 and display system 628 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as media-data port 630. In some implementations, audio system 626 and display system 628 are external components to electronic device 600. Alternatively, or additionally, audio system 626 and/or display system 628 can be an integrated component of the example electronic device 600, such as part of an integrated speaker and/or an integrated display and touch interface.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

I claim:

1. A computer-implemented method comprising:
    collecting, at a computing device, information associated with user interactions with a shopping application of the computing device to generate user context information that identifies items of interest associated with a user, the user context information including active user feedback that prioritizes actions;
    receiving, at the computing device and from an external computing device, an incoming communication directed to a banking application that is different from the shopping application;
    identifying one or more characteristics about the incoming communication by analyzing content included in the incoming communication;
    analyzing the user context information using the one or more characteristics to identify at least some user context information of the user context information that is relevant to the incoming communication, said analyzing comprising using at least one data mining algorithm to correlate the one or more characteristics to the at least some user context information;
    generating, based on the analyzing, an action recommendation that correlates a first item of interest associated with the shopping application and a second item of interest associated with the banking application based, at least in part, on the active user feedback that prioritizes actions, the action recommendation based on invoking the shopping application, the first item of interest and the second item of interest being two unrelated items of interest, and the shopping application being unrelated to the banking application, wherein the first item of interest associated with the shopping application comprises an item in a pending purchase transaction, the second item of interest associated with the banking application comprises a monetary deposit, and the action recommendation comprises a recommendation to complete the pending purchase transaction; and
    outputting the action recommendation via the computing device.

2. The computer-implemented method of claim 1, wherein said identifying further comprises identifying a duration of time between communication attempts with a sender associated with the incoming communication.

3. The computer-implemented method of claim 2, wherein said analyzing the context information further comprises identifying a frequency of communication associated with the sender.

4. The computer-implemented method of claim 1, wherein said outputting further comprises rendering a control button associated with invoking the shopping application.

5. The computer-implemented method of claim 1, wherein said identifying further comprises identifying a key word included in the incoming communication.

6. The computer-implemented method of claim 1, further comprising:
    receiving audio input;
    analyzing the audio input to identify one or more commands; and performing the one or more commands.

7. An electronic device comprising:
one or more processors; and
one or more computer-readable storage devices comprising processor executable instructions which, responsive to execution by the one or more processors, enable the electronic device to perform operations comprising:
collecting context information associated with user interactions with a shopping application of the electronic device using a context engine module to generate user context information that identifies items of interest, the user context information including inactive user feedback associated with a first context-based action recommendation, the inactive user feedback comprising user preferences learned through indirect user input;
receiving an incoming communication from an external computing device directed to a banking application that is different from the shopping application;
identifying one or more characteristics associated with the incoming communication by analyzing content included in the incoming communication;
analyzing the user context information using the one or more characteristics associated with the incoming communication and one or more data mining algorithms to correlate at least some user context information of the user context information with the one or more characteristics;
generating, based on the analyzing, a second context-based action recommendation that correlates a first item of interest associated with the shopping application and a second item of interest associated with the banking application based, at least in part, on the at least some user context information and the inactive user feedback, the action recommendation based on invoking the shopping application, the first item of interest and the second item of interest being two unrelated items of interest, and the shopping application being unrelated to the banking application, wherein the first item of interest associated with the shopping application comprises an item in a pending purchase transaction, the second item of interest associated with the banking application comprises a monetary deposit, and the action recommendation comprises a recommendation to complete the pending purchase transaction;
determining the electronic device is operating with an audio control mode enabled;
audibly providing the context-based action recommendation;
receiving audio input to perform one or more actions in response to the context-based action recommendation; and
performing the one or more actions.

8. The electronic device of claim 7, wherein said collecting the context information further comprises collecting data associated with:
a call log;
one or more user interactions with an application; or
one or more user interactions with a web site.

9. The electronic device of claim 7, wherein said performing the one or more actions further comprises invoking the shopping application.

10. The electronic device of claim 7, wherein said identifying the one or more characteristics further comprises identifying whether a sender associated with the incoming communication has a higher priority relative to other senders.

11. The electronic device of claim 7, wherein the incoming communication comprises:
a text message;
an e-mail message;
a voice call; or
a video call.

12. The electronic device of claim 7, wherein said identifying the one or more characteristics further comprises matching a key phrase to the content included in the incoming communication.

13. The electronic device of claim 7, wherein the operations further comprise generating a health-based context-based action recommendation.

14. A device comprising:
a network interface implemented for communication in one or more networks; and
a memory and processor system to implement a context engine module, a recommendation generation module, and a notification module that enable the device to perform operations comprising:
collecting context information associated with user interactions with a shopping application of the device to generate user context information that identifies items of interest, the items of interest including an indication of a pending purchase action associated with the shopping application;
receiving, over the network interface, an incoming communication from an external computing device that is directed to a banking application that is unrelated to the shopping application;
identifying one or more characteristics associated with the incoming communication that is directed to the banking application by analyzing content included in the incoming communication, the items of interest including a monetary deposit associated with the banking application;
analyzing the user context information using the one or more characteristics associated with the incoming communication that is directed to the banking application and one or more data mining algorithms to correlate the one or more characteristics associated with the incoming communication that is directed to the banking application to at least the pending action associated with the shopping application effective to generate an action recommendation that suggests completion of the pending action via the shopping application, the incoming communication being associated with the monetary deposit that is unrelated to the pending purchase action, wherein the action recommendation comprises a recommendation to complete the pending purchase action;
determining the device is operating with an audio control mode enabled;
audibly providing the action recommendation;
receiving input to perform the action recommendation; and
performing the action recommendation by invoking the shopping application.

15. The device as recited in claim 14 wherein said audibly providing the action recommendation further comprises audibly providing a notification of the incoming communication with the action recommendation.

16. The device as recited in claim 14, wherein said analyzing the context information further comprises identifying uncompleted communication attempts with a sender of the incoming communication, and
wherein the action recommendation suggests completion of the uncompleted communication attempts.

17. The device as recited in claim 14, wherein the incoming communication comprises a notification that the monetary deposit has been made in a bank account of the user.

18. The device as recited in claim 14, wherein said audibly providing the action recommendation comprises audibly providing historic user context information associated with the pending action.

\* \* \* \* \*